May 16, 1967     E. COZZARIN     3,320,006
VENTED MECHANICAL DEVICE
Filed Nov. 1, 1963
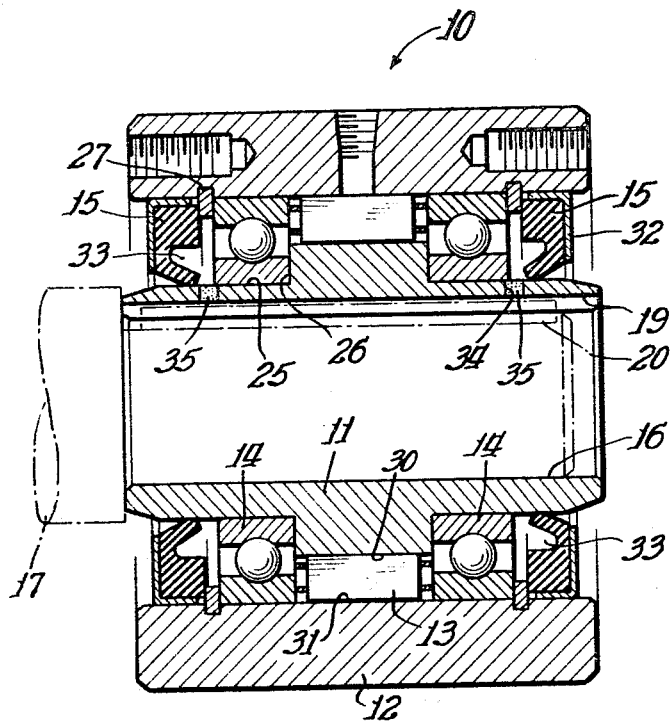
Inventor:
Edward Cozzarin
By: Evan D. Roberts Atty

United States Patent Office 3,320,006
Patented May 16, 1967

3,320,006
VENTED MECHANICAL DEVICE
Edward Cozzarin, Ithaca, N.Y., assignor to Morse Chain Company, Ithaca, N.Y., a corporation of New York
Filed Nov. 1, 1963, Ser. No. 320,905
1 Claim. (Cl. 308—36.1)

This invention relates to vented translational and rotational devices and more particularly, to an improved vented rotational device having a porous restrictive vent structure.

In translational and rotational devices generally and particularly in rotational devices such as sprag and/or cam clutches where the outer element of the device is rotatably mounted on bearings on an inner element and the bearings are sealed in a lubricant enclosure that relative rotation of the outer element with respect to the inner element creates friction that results in the heating of the lubricant and the adjacent air space within the sealed lubricant enclosure causing the enclosed lubricant and air to expand. The expansion of the lubricant and the surrounding air enclosed by the seal tends to force the lubricant past the seal and in some instances where the seal is tight the seal may be damaged by the increased presure. In either event, the lubricant may be caused to bypass the seal both during operation of the device and when the device is stopped.

There have been numerous attempts to relieve the pressure in translational and rotational devices having sealed bearings. The structures of these attempts either utilize numerous parts and are therefore unduly complicated and expensive or are of more simple construction but are restrictive with respect to the lubricant level that can be maintained therein. It is therefore highly desirable to provide a vented translational or rotational device wherein a relatively simple vent structure is provided for the bearing lubrication chamber thereof and that will allow a higher lubricant level to be maintained in the device than that which can be maintained in presently known types of vented rotational devices.

It is a general object of this invention to provide a translational or rotational device having an improved lubricant vent structure which is relatively simple and economical to manufacture, use and maintain.

A more particular object of this invention is to provide a rotational device having an improved lubricant vent structure which will vent the bearing lubricant enclosure chamber thereof both during operation and inoperation of the device in a manner so as to substantially avoid loss of lubrication due to centrifugal action, expansion of the oil and by gravity.

A further particular object of this invention is to provide a vented rotational device having an improved lubricant vent structure that will restrict the flow of liquid and facilitate the flow of gas to aid in the maintenance of a higher liquid lubricant level than might otherwise be possible.

With these and other objects in view, this present invention contemplates a translational or rotational device wherein a first member is mounted on a shaft, a second member is movably mounted on the first member on bearings contained in a lubrication chamber enclosed by seals extending from the first to the second member and the first member is provided with a vent passage extending generally radially inward and generally axially outward for venting the bearing enclosure to the atmosphere through the first member and a porous plug is secured in the vent passage for restricting the flow of liquid through the passage and for facilitating the flow of gas through the passage.

A cam clutch generally designated by the numeral 10 is illustrated in the drawing for purposes of describing the invention; however, it must be noted that this invention is not necessarily limited to this particular type of device. The clutch 10 includes, among other things, an inner race member 11 and outer race member 12, sprags and/or cams 13, bearings 14, and seals 15.

The inner race 11 is provided with a shaft passage 16 adapted to receive a drive shaft 17 and a keyway 19 adapted to receive a key 20 supported in the keyway 19 and in the shaft 17 for locking the inner race 11 to the shaft. The bearings 14 are supported on an outer surface 25 of the inner race 11 against shoulders 26 extending radially outward. The outer race 12 is mounted on the bearings 14 and is thereby rotatably mounted on the inner race 11 and is held against axial and longitudinal motion by rings 27 positioned in grooves in the outer race 12. The sprags or cams 13 are positioned between a circumferential surface 30 of the inner race 11 and an internal surface 31 of the outer race 12 that is substantially concentric with the surface 30 of the inner race 11.

The sprags 13 can have any one of many configurations normally utilized in cam clutches and for purposes of illustrating this invention the sprags are of the type which are cammed into engagement with the surfaces 30 and 31 of the inner and outer races to provide a drive therebetween when a load is applied to the outer race 12 and the drive shaft 17 is rotated in one direction but, which will not provide such drive connection when the drive shaft 17 is rotated in the other direction. In the former you have the typical drive provided by a cam clutch and in the latter you have the typical overrunning or freewheeling effect. A lubricant (not shown) is provided for the bearings 14 and the sprags 13 and is retained by the seals 15 held in position by retaining casings 32 press fitted or otherwise secured to the inner surface 31 of the outer race 12. It should be noted that the seals 15 provide a bearing lubricant enclosure 33 for the purpose of retaining the lubricant in the area of the bearings 14.

The invention illustrated by the cam clutch 10 is provided with an improved venting structure for the lubricant enclosure 33. In particular, the inner race 11 of the clutch 10 is provided with a small vent passage 34 formed therein interconnecting the bearing lubricant enclosure chamber 33 with the keyway 19 so that it is possible for the chamber to vent radially inward through the passage 34 and axially outward through the keyway 19 to the atmosphere. A vent restriction element 35 is secured in the passage 34. The element 35 may be made of sintered metal, foamed plastic or fiber, or a combination of metal, plastic fiber or other material which is substantially not subject to erosion or the effects of lubricants but which is provided with interstices that will allow gases to pass therethrough but which will restrict the flow of liquid such as oil used as a lubricant in the device.

In the operation of the invention, the drive shaft 17 may be rotated in one direction to provide driving connection between the inner and outer races 11 and 12 or it may be driven in the other direction without a driving connection in an overrunning effect. In the latter case, the friction in the bearings 14 and other adjacent rotating elements positioned between the inner and outer members will cause the lubricant and the surrounding air in the bearing lubricant enclosure 33 to elevate in temperature and expand.

Ordinarily, the expansion in the lubricant and air in the chamber 33 will tend to force lubricant between the inner race surface 25 and the seals 15 or cause rupture of the seals themselves and eventual loss of lubricant. However, the inner race 11 of the invention has the passage 34 formed therein with the elements 35 secured therein to provide a means by which the expanding air in the bearing lubricant enclosure 33 may escape to the keyway passage 19 and then to the atmosphere to relieve the pressure within the enclosure but which will resist the flow of liquid lubricant to prevent loss thereof. Similarly, the air may be drawn into the enclosure 33 from the atmosphere when the lubricant and air in the enclosure tend to contract due to cooling off of the clutch during less severe use.

It should be noted that the passage or passages 34 are directed radially inward into the keyway 19 so that centrifugal action during the relative rotation of the inner and outer races 11 and 12 cannot cause lubricant to be forced out through the passages 34 and 19 inasmuch as the lubricant will be forced radially outward allowing only air to pass radially inward through the passage 34. Also, inasmuch as the passage or passages 34 are formed in the inner race and extend radially inward and can only vent through the keyway 19 which is not otherwise connected with the chamber 33, lubricant below the level of the lower surface of the shaft passage 16 in the cam clutch lubricant enclosure 33 will not run out of the bearing lubricant enclosure under the force of gravity when the inner race 11 is stopped with the passage 34 in the down position which is opposite to the position shown.

If the restriction element were not utilized and it was desirable to have the lubricant level above the lower portion of the passage 16, it can be readily seen that in the event that the inner race 11 is stopped with the passage 34 in the down position (opposite to that shown) there would be a tendency for lubricant to enter the passage and the keyway and thereby drain from the lubricant chamber 33. However, the restriction element is provided with interstices of predetermined size that will restrict the flow of lubricant and yet facilitate the flow of gases therethrough and thereby tend to prevent loss of lubricant through the passage 34 and the keyway 19 when the higher level of lubricant is desired. Thus, the present invention provides an improved vent structure for a rotational device such as a cam clutch wherein the lubricant level therein may be maintained at a higher level than might otherwise be possible.

It is to be understood that the invention is not to be limited to the specific constructions and arrangements shown and described, except only insofar as the claim may be so limited, as it will be understood to those skilled in the art that changes may be made without departing from the principles of the invention.

What is claimed is:

A rotational device adapted to be mounted on a shaft comprising a first inner member mounted on the shaft, a second outer member positioned around said first member, bearing means for rotatably supporting said second member on said first member, seal means extending between said first and second members for enclosing said bearing means between said first and second members, said first member having a passage formed therein extending radially inward and axially outward from the bearing enclosure to the atmosphere surrounding said device, a bearing lubricant contained within the bearing enclosure, and a porous plug secured in the radial portion of the passage, said plug having sufficiently small interstices therein to prevent said lubricant from passing therethrough and being interconnected to allow the flow of gas through the passage to maintain the lubricant quantity within the bearing enclosure.

References Cited by the Examiner
UNITED STATES PATENTS

| | | | |
|---|---|---|---|
| 2,009,423 | 7/1935 | Wheeler | 277—29 |
| 2,480,229 | 8/1949 | Dow | 277—78 X |
| 2,688,102 | 8/1954 | Jackson | 308—187 X |
| 2,979,350 | 4/1961 | Lansky | 277—29 X |
| 3,227,497 | 1/1966 | Heckethorn | 308—3.5 |
| 3,256,049 | 6/1966 | Josephson et al. | 208—240 |

MARTIN P. SCHWADRON, *Primary Examiner.*

DAVID J. WILLIAMOWSKY, MARTIN P. SCHWADRON, *Examiners.*

R. F. HESS, *Assistant Examiner.*